US011875965B2

(12) United States Patent
Ishii

(10) Patent No.: US 11,875,965 B2
(45) Date of Patent: Jan. 16, 2024

(54) X-RAY TUBE

(71) Applicant: HAMAMATSU PHOTONICS K.K., Hamamatsu (JP)

(72) Inventor: Atsushi Ishii, Hamamatsu (JP)

(73) Assignee: HAMAMATSU PHOTONICS K.K., Hamamatsu (JP)

(*) Notice: Subject to any disclaimer, the term of this patent is extended or adjusted under 35 U.S.C. 154(b) by 0 days.

(21) Appl. No.: 17/626,563

(22) PCT Filed: Jul. 13, 2020

(86) PCT No.: PCT/JP2020/027234

§ 371 (c)(1),
(2) Date: Jan. 12, 2022

(87) PCT Pub. No.: WO2021/015036

PCT Pub. Date: Jan. 28, 2021

(65) Prior Publication Data

US 2022/0246384 A1 Aug. 4, 2022

(30) Foreign Application Priority Data

Jul. 24, 2019 (JP) ................................ 2019-136167

(51) Int. Cl.
*H01J 35/14* (2006.01)
*H01J 35/16* (2006.01)

(52) U.S. Cl.
CPC ............ *H01J 35/147* (2019.05); *H01J 35/16* (2013.01); *H01J 35/14* (2013.01); *H01J 2235/166* (2013.01)

(58) Field of Classification Search
CPC ..... H01J 35/147; H01J 35/16; H01J 2235/166
See application file for complete search history.

(56) References Cited

U.S. PATENT DOCUMENTS

2007/0058782 A1* 3/2007 Okada ..................... H01J 35/14 378/138
2014/0192957 A1 7/2014 Tamura et al.

FOREIGN PATENT DOCUMENTS

CN 103400739 A 11/2013
JP S63-091943 A 4/1988

(Continued)

OTHER PUBLICATIONS

JP-2016046145-A with English tranlation (Year: 2016).*
International Preliminary Report on Patentability dated Feb. 3, 2022 for PCT/JP2020/027234.

*Primary Examiner* — Chih-Cheng Kao
(74) *Attorney, Agent, or Firm* — Faegre Drinker Biddle & Reath LLP

(57) ABSTRACT

An X-ray tube includes an electron gun unit, a target that generates X-rays, and a vacuum housing unit. The vacuum housing unit has a metal housing unit for supporting the target and a bulb unit formed of an insulating material and connected to the metal housing unit. The electron gun unit has a focusing electrode portion at an end portion on an emission side of the electrons, the focusing electrode portion having a tubular shape for focusing the emitted electrons. In the electron gun unit, at least a part of the focusing electrode portion is supported by the bulb unit so as to be located in the metal housing unit. When viewed from an X-ray generation position on the target, the focusing electrode portion blocks a line of sight from the X-ray generation position to the bulb unit.

8 Claims, 7 Drawing Sheets

(56) References Cited

FOREIGN PATENT DOCUMENTS

| | | | |
|---|---|---|---|
| JP | H07-282754 | A | 10/1995 |
| JP | 2005-038825 | A | 2/2005 |
| JP | 2007-066694 | A | 3/2007 |
| JP | 2012-028133 | A | 2/2012 |
| JP | 5787626 | B2 | 9/2015 |
| JP | 2016-046145 | A | 4/2016 |
| JP | 2018-190526 | A | 11/2018 |
| JP | 2018-206677 | A | 12/2018 |
| TW | 200731314 | A | 8/2007 |
| TW | 201909227 | A | 3/2019 |
| WO | WO-2007/043391 | A1 | 4/2007 |

* cited by examiner

X-RAY TUBE

TECHNICAL FIELD

The present disclosure relates to an X-ray tube.

BACKGROUND ART

Patent Literature 1 describes an X-ray tube that generates X-rays. The X-ray tube includes an electron gun unit that emits electrons, a target that generates X-rays due to the incidence of electrons, and a bulb unit formed of an insulating material (airtight container formed of glass) in which the electron gun unit and the target are housed. The electron gun unit is held by the bulb unit.

CITATION LIST

Patent Literature

Patent Literature 1: Japanese Unexamined Patent Publication No. 2007-66694

SUMMARY OF INVENTION

Technical Problem

Here, in the X-ray tube described above, X-rays generated at the target are not only emitted to the outside of the X-ray tube but also emitted to the vacuum region side inside the X-ray tube and are incident on the bulb unit. At this time, when X-rays are incident on the bulb unit that is an insulator, the bulb unit may be charged to reduce the withstand voltage capability and accordingly, electric discharge may occur.

Therefore, it is an object of the present disclosure to provide an X-ray tube in which the incidence of X-rays on a bulb unit can be suppressed.

Solution to Problem

An X-ray tube according to an aspect of the present disclosure is an X-ray tube including: an electron gun unit that emits electrons; a target that generates X-rays due to incidence of the electrons; and a vacuum housing unit in which the electron gun unit and the target are housed. The vacuum housing unit has a metal housing unit for supporting the target and a bulb unit formed of an insulating material and connected to the metal housing unit. The electron gun unit has a focusing electrode portion at an end portion on an emission side of the electrons, the focusing electrode portion having a tubular shape for focusing the emitted electrons, and at least a part of the focusing electrode portion is supported by the bulb unit so as to be located in the metal housing unit. When viewed from an X-ray generation position on the target, the focusing electrode portion blocks a line of sight from the X-ray generation position to the bulb unit.

In the X-ray tube, the line of sight from the X-ray generation position on the target to the bulb unit is blocked by the focusing electrode portion, which is at least partially located in the metal housing unit. Therefore, even if X-rays are emitted from the X-ray generation position of the target to the vacuum region in the vacuum housing unit, the X-rays from the X-ray generation position to the bulb unit are blocked by the focusing electrode portion. In this manner, in the X-ray tube, it is possible to suppress the incidence of X-rays on the bulb unit.

In the X-ray tube, the focusing electrode portion may have a protruding portion that protrudes outward. Therefore, the focusing electrode portion can efficiently block the line of sight from the X-ray generation position to the bulb unit by using the protruding portion. That is, the focusing electrode portion can efficiently block the X-rays from the X-ray generation position to the bulb unit by using the protruding portion.

In the X-ray tube, the protruding portion may be provided at the end portion on the target side on the outer peripheral surface of the focusing electrode portion. In this case, the protruding portion can block X-rays at a position closer to the X-ray generation position. That is, the protruding portion can block X-rays before the X-ray spread greatly from the X-ray generation position. As a result, in the X-ray tube, it is possible to suppress the incidence of X-rays on the bulb unit while suppressing the protruding height of the protruding portion.

In the X-ray tube, a corner portion of the protruding portion may be rounded so as to be curved. In this case, in the focusing electrode portion, the concentration of the electric field on the corner portion of the protruding portion is suppressed. Therefore, it is possible to suppress the generation of electric discharge starting from the corner portion of the protruding portion.

In the X-ray tube, an outer peripheral surface of the focusing electrode portion may have a tapered shape whose diameter increases toward the target. Then, since an end portion of the focusing electrode portion on the target side has a smooth large diameter, it is possible to efficiently block the line of sight from the X-ray generation position to the bulb unit by the large diameter portion while suppressing the local concentration of the electric field on the outer peripheral surface. That is, the focusing electrode portion can efficiently block the X-rays from the X-ray generation position to the bulb unit by using the large diameter portion.

In the X-ray tube, a corner portion between the outer peripheral surface of the focusing electrode portion and an end surface of the focusing electrode portion on the target side may be rounded so as to be curved. In this case, in the focusing electrode portion, the concentration of the electric field on the corner portion between the outer peripheral surface of the focusing electrode portion and the end surface of the focusing electrode portion on the target side is suppressed. Therefore, it is possible to suppress the generation of electric discharge starting from the corner portion.

Advantageous Effects of Invention

According to the present disclosure, it is possible to suppress the incidence of X-rays on the bulb unit.

DESCRIPTION OF EMBODIMENTS

Figure 1:
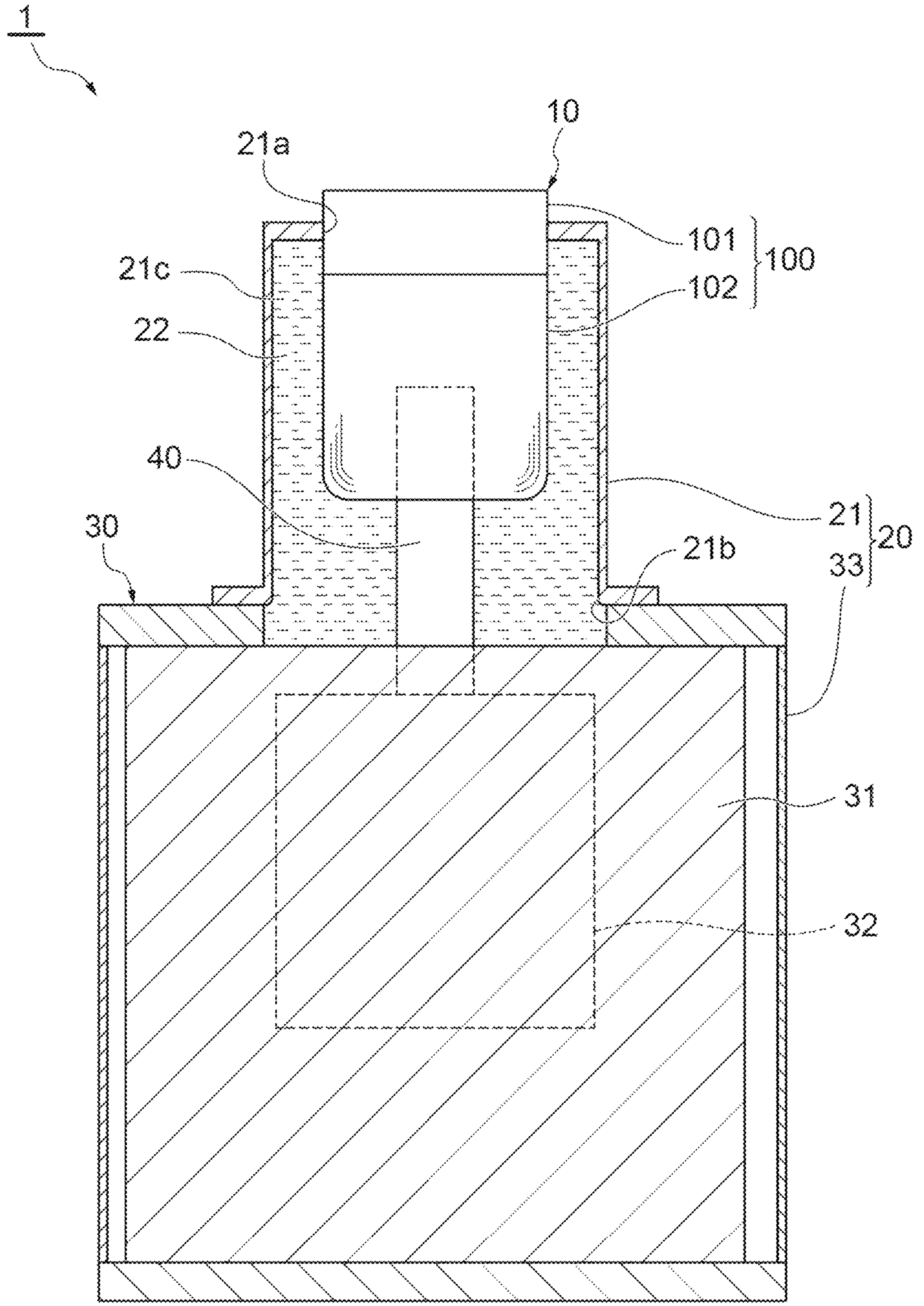
FIG. 1 is a vertical cross-sectional view showing an X-ray generator according to an embodiment.

Hereinafter, embodiments of the present disclosure will be described with reference to the diagrams. In addition, in the following description, the same or equivalent elements are denoted by the same reference numerals, and repeated description thereof will be omitted.

Figure 2:
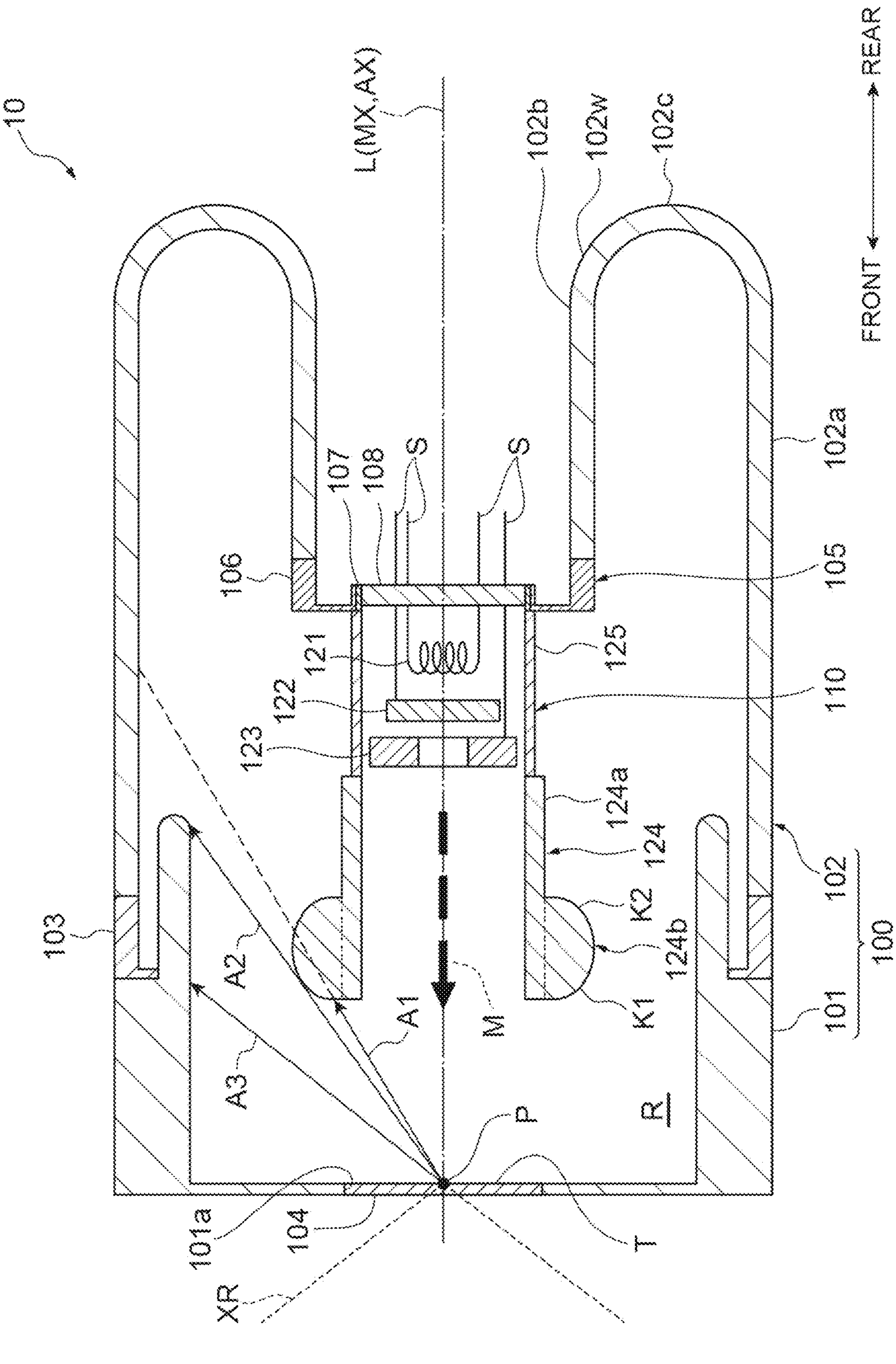
FIG. 2 is an end view of an X-ray tube in FIG. 1 when the X-ray tube is cut in the vertical direction.

As shown in FIGS. 1 and 2, an X-ray generator 1 is, for example, a microfocal X-ray source used for an X-ray nondestructive inspection for observing the internal structure of a subject. The X-ray generator 1 includes an X-ray tube 10, a device housing unit 20, and a power supply unit 30.

The X-ray tube 10 includes a vacuum housing unit 100, an electron gun unit 110, and a target T. The electron gun unit 110 emits an electron beam M (electrons) along the emission axis MX. The X-ray tube 10 is a transmissive X-ray tube that emits an X-ray XR, which is generated due to the incidence of the electron beam M from the electron gun unit 110 on the target T and passes through the target T itself, from an X-ray emission window 104. The X-ray tube 10 is a vacuum-sealed X-ray tube including the vacuum housing unit 100 having a vacuum internal space R. In addition, in the following description, for convenience of explanation, the side where the target T is provided with respect to the electron gun unit 110 is referred to as a "front side", and the opposite side is referred to as a "rear side".

The electron gun unit 110 and the target T are housed in the vacuum housing unit 100. The vacuum housing unit 100 has an approximately columnar outer shape extending along the tube axis AX of the X-ray tube 10. In addition, in the present embodiment, the tube axis AX is the same axis as the emission axis MX. Since the tube axis AX and the emission axis MX are the same axis, these are also collectively referred to as an axis L below. The vacuum housing unit 100 includes a head unit (metal housing unit) 101 formed of a metal material (for example, stainless steel, copper, copper alloy, or iron alloy) and a bulb unit 102 formed of an insulating material (for example, glass or ceramic). The head unit 101 is disposed on the front side of the bulb unit 102. The head unit 101 and the bulb unit 102 are connected to each other by a bulb flange 103 formed of a metal material, such as Kovar.

The bulb unit 102 has a cylindrical shape extending along the tube axis AX of the X-ray tube 10. In the rear-side end portion of the bulb unit 102, a cylindrical recessed portion 102*w* formed so as to extend along the tube axis AX so as to be folded back toward the front side is provided. That is, the bulb unit 102 has an outer cylinder 102*a*, an inner cylinder 102*b* disposed in the outer cylinder 102*a*, and a cylinder connecting portion 102*c* that connects the rear-side end portion of the outer cylinder 102*a* and the rear-side end portion of the inner cylinder 102*b* to each other. The outer cylinder 102*a* and the inner cylinder 102*b* extend along the axis L.

A stem portion 105 is provided at an opening in the front-side end portion of the inner cylinder 102*b* so as to seal the opening. The stem portion 105 includes a bulb flange 106, a stem flange 107, and a stem 108. The stem 108 is formed of an insulating material (for example, glass or ceramic), and has a circular plate shape. The stem flange 107 is formed of a conductive material (for example, Kovar), and has a cylindrical shape. The stem 108 is fixed to the inside of the stem flange 107. The bulb flange 106 is formed of a conductive material (for example, Kovar), and has an approximately cylindrical shape. The stem flange 107 is fitted and fixed in the bulb flange 106. The bulb flange 106 is connected to the front-side end portion of the inner cylinder 102*b* in the bulb unit 102.

A stem pin S is provided in the stem 108. The stem pin S extends in a state of penetrating the stem 108 over the internal region and the external region of the vacuum housing unit 100. The stem pin S is electrically connected to each component (heater 121 and the like) of the electron gun unit 110 to supply power to each component of the electron gun unit 110.

The stem portion 105 holds the electron gun unit 110 at a predetermined position in the internal space R. That is, the electron gun unit 110 is supported by the bulb unit 102 through the stem portion 105. That is, due to the recessed portion 102*w*, the creepage distance between the head unit 101 and the electron gun unit 110 is increased to improve the withstand voltage characteristics. In addition, arranging the electron gun unit 110 close to the target T in the internal space R makes it easier to make the electron beam M microfocused.

The head unit 101 is formed of a metal material, and potentially corresponds to the anode of the X-ray tube 10. The head unit 101 has openings at both ends, and has an approximately cylindrical shape extending along the axis L. The head unit 101 communicates with the bulb unit 102 extending along the axis L at the rear-side opening (see FIG. 2).

The X-ray emission window 104 is fixed to the front-side surface of the head unit 101 so as to cover a front-side opening 101*a* of the head unit 101. The X-ray emission window 104 has, for example, a circular plate shape. The X-ray emission window 104 is formed of a material having high X-ray transparency, such as beryllium, aluminum, and diamond.

The target T is provided on the surface of the X-ray emission window 104 on the internal space R side. That is, the target T is supported by the head unit 101. In the present embodiment, the target T is formed on the surface of the X-ray emission window 104 on the internal space R side. The target T generates X-rays due to the incidence of the electron beam M (electrons). As the target T, for example, tungsten, molybdenum, and copper are used.

The electron gun unit 110 emits electrons toward the target T. The electron gun unit 110 includes the heater 121, a cathode 122, a first grid electrode 123, a second grid electrode (focusing electrode portion) 124, and an electron gun housing unit 125.

The heater 121 is formed of a filament that generates heat when power is supplied. The cathode 122 becomes an electron emission source that emits electrons by being heated by the heater 121. The first grid electrode 123 controls the amount of electrons emitted from the cathode 122.

The second grid electrode 124 focuses the electrons that have passed through the first grid electrode 123 toward the target T. The second grid electrode 124 also functions as an extraction electrode that forms an electric field for extracting the electrons forming the electron beam M. The first grid electrode 123 is disposed between the cathode 122 and the second grid electrode 124. The electron gun housing unit 125 is formed of a conductive material (for example, stainless steel), and has a cylindrical shape. The heater 121, the cathode 122, and the first grid electrode 123 are housed in the electron gun housing unit 125. The front-side end portion of the electron gun housing unit 125 is connected to the second grid electrode 124 and also serves as a power supply path for the second grid electrode 124. The rear-side end portion of the electron gun housing unit 125 is connected to the stem portion 105.

The device housing unit 20 includes a tubular member (housing unit) 21 and a power supply case 33 that is a part of the power supply unit 30. The tubular member 21 is formed of metal. The tubular member 21 has a cylindrical shape with openings at both ends thereof, and has an internal space 21*c*. The bulb unit 102 of the X-ray tube 10 is inserted into an opening 21*a* on one end side of the tubular member 21. As a result, at least a part of the X-ray tube 10 is housed in the tubular member 21. More specifically, in the present embodiment, the entire bulb unit 102 is housed in the tubular member 21.

The opening 21*a* of the tubular member 21 is sealed by the head unit 101 of the X-ray generator 1. Insulating oil 22, which is a liquid electrically insulating material, is sealed in the internal space 21*c* of the tubular member 21.

The power supply unit 30 has a function of supplying electric power to the X-ray tube 10. The power supply unit 30 includes an insulating block 31 formed of a molded solid insulating material, for example, an epoxy resin that is an insulating resin, a boosting portion 32 molded in the insulating block 31, and the power supply case 33 in which these are housed and which has a rectangular box shape. The boosting portion 32 generates a high voltage by adjusting the boosted voltage, which is generated by boosting the introduced voltage introduced from the outside of the X-ray generator 1, as necessary based on various conditions. The insulating block 31 seals the boosting portion 32 with an insulating material (for example, epoxy resin). The other end side of the tubular member 21 is fixed to the power supply unit 30 (power supply case 33). As a result, an opening 21*b* on the other end side of the tubular member 21 is sealed, and the insulating oil 22 is sealed in the internal space 21*c* of the tubular member 21.

In addition, the X-ray generator 1 includes a power feeding unit 40 that electrically connects the boosting portion 32 and the X-ray tube 10 to each other. The power feeding unit 40 supplies electric power (high voltage) from the power supply unit 30 to the X-ray tube 10. More specifically, one end portion of the power feeding unit 40 is connected to the boosting portion 32. The other end portion of the power feeding unit 40 is inserted into the recessed portion 102*w* of the bulb unit 102 of the X-ray tube 10 and is electrically connected to the stem pin S protruding from the vacuum internal space R at the stem portion 105. The power feeding unit 40 has a plurality of wires for supplying electric power.

In addition, in the present embodiment, as an example, the target T (anode) is set as a ground potential, and a high voltage of −100 kV is supplied from the power supply unit 30 to the X-ray tube 10 (electron gun unit 110) through the power feeding unit 40. In addition, in practice, a high voltage of −100 kV adjusted according to the function of each electrode is applied to each electrode of the electron gun unit 110. However, Hereinafter, for the sake of simplicity of explanation, the voltage applied to the electron gun unit 110 is assumed to be −100 kV.

Next, the details of the second grid electrode 124 included in the electron gun unit 110 will be described. As shown in FIG. 2, the second grid electrode 124 focuses the electrons emitted from the electron gun unit 110. The second grid electrode 124 has a tubular shape, and is provided at the end portion of the electron gun unit 110 on the target T side (electron emission side). Here, the electron gun unit 110 is supported by the bulb unit 102 through the stem portion 105 so that at least a part of the second grid electrode 124 is located in the head unit 101. That is, the distal end portion (the end portion on the target T side (electron emission side)) of the electron gun unit 110 is inserted into the head unit 101.

Here, the target T generates X-rays at the X-ray generation position P. The X-ray generation position P is a position where the electron beam M (electrons) emitted from the electron gun unit 110 is incident on the target T to generate (emit) X-rays. Since the X-rays generated at the X-ray generation position P are emitted in all directions centered on the X-ray generation position P, the X-rays are not only transmitted through the target T and emitted from the X-ray emission window 104, but also emitted to the internal space R side.

When the X-rays emitted to the internal space R side are incident on the bulb unit 102 that is an insulator, the bulb unit 102 may be charged to cause electric discharge. Therefore, the second grid electrode 124 has a function of focusing electrons and a function of suppressing X-rays emitted to the internal space R side from being incident on the bulb unit 102.

Specifically, the second grid electrode 124 blocks the line of sight from the X-ray generation position P to the bulb unit 102 when viewed from the X-ray generation position P on the target T. Blocking the line of sight herein means that the bulb unit 102 cannot be directly visually recognized (seen through) from the X-ray generation position P due to the presence of the second grid electrode 124. In other words, this means that the straight line connecting the X-ray generation position P and the bulb unit 102 is blocked by the second grid electrode 124.

Here, the line of sight from the X-ray generation position P to the bulb unit 102 through the inside (the space through which the electrons emitted from the cathode 122 pass) of the tubular second grid electrode 124 is blocked by the first grid electrode 123, the electron gun housing unit 125, and the like. Here, the second grid electrode 124 blocks the line of sight from the X-ray generation position P to the bulb unit 102 so that the bulb unit 102 cannot be directly visually recognized from the X-ray generation position P through the outside (the space between the second grid electrode 124 and the vacuum housing unit 100) of the tubular second grid electrode 124. More specifically, the second grid electrode 124 blocks the line of sight from the X-ray generation position P to the bulb unit 102 so that the bulb unit 102 cannot be directly visually recognized from the X-ray generation position P through the gap between the inner peripheral surface of the head unit 101 and the outer peripheral surface of the second grid electrode 124.

More specifically, the second grid electrode 124 has a tubular portion 124*a* with a tubular shape and a protruding portion 124*b*. The tubular portion 124*a* extends along the axis L. In the present embodiment, the tubular portion 124*a* has a cylindrical shape extending linearly along the axis L. The protruding portion 124*b* is provided on the outer peripheral surface of the tubular portion 124*a*. The protruding portion 124*b* protrudes from the outer peripheral surface of the tubular portion 124*a* toward the outside (inner peripheral surface side of the head unit 101). That is, the second grid electrode 124 has the protruding portion 124*b* that protrudes outward. The protruding portion 124*b* is provided at the end portion on the target T side on the outer peripheral surface of the tubular portion 124*a*.

In addition, the protruding portion 124*b* extends over the entire peripheral surface of the tubular portion 124*a* in the circumferential direction. That is, the protruding portion 124*b* has an annular shape through which the tubular portion 124*a* passes. The outer peripheral corner portions of the protruding portion 124*b* are rounded so as to be curved. More specifically, on the outer peripheral side (the side protruding from the tubular portion 124*a*) of the annular protruding portion 124*b*, a corner portion K1 on the front side is rounded so as to be curved. Similarly, on the outer peripheral side (the side protruding from the tubular portion 124*a*) of the annular protruding portion 124*b*, a corner portion K2 on the rear side is rounded so as to be curved. The curved R shape (curvature) at the corner portion K1 and the curved R shape (curvature) at the corner portion K2 may be different or may be the same. The protruding portion 124*b* may have a semicircular cross section.

The second grid electrode 124 blocks the line of sight from the X-ray generation position P toward the bulb unit 102. Specifically, for example, as shown by the arrow A1, the line of sight from the X-ray generation position P to the bulb unit 102 (outer cylinder 102*a*) is blocked by the protruding portion 124*b*. In addition, for example, the line of sight indicated by the arrows A2 and A3 is directed from the X-ray generation position P toward the head unit 101 and is not blocked by the second grid electrode 124. However, since the head unit 101 is formed of a metal material, the head unit 101 is not charged even if X-rays are incident.

The second grid electrode 124 is formed of, for example, a metal material capable of shielding X-rays. As a material of the second grid electrode 124, for example, tungsten, molybdenum, tantalum, and stainless steel may be used. In addition, the electron gun unit 110 has a high temperature. Therefore, the second grid electrode 124 may be formed of, for example, a high melting point metal material having a melting point equal to or higher than a predetermined temperature (for example, 1000°) among the metal materials capable of shielding X-rays. As a high melting point metal material, for example, tungsten, molybdenum, and tantalum may be used.

In addition, FIG. 2 shows a case of a cylindrical shape extending linearly along the axis L direction as an example of the shape of the inner peripheral surface of the second grid electrode 124. However, various shapes can be adopted as the shape of the inner peripheral surface of the second grid electrode 124.

As described above, in the X-ray tube 10, the line of sight from the X-ray generation position P on the target T to the bulb unit 102 is blocked by the second grid electrode 124. Therefore, even if X-rays are emitted from the X-ray generation position P of the target T to the internal space R (vacuum region) of the vacuum housing unit 100, the X-rays from the X-ray generation position P toward the bulb unit 102 are blocked by the second grid electrode 124. That is, the X-rays linearly traveling from the X-ray generation position P to the bulb unit 102 (X-rays directly incident on the bulb unit 102 from the X-ray generation position P) are blocked by the second grid electrode 124. Therefore, it is possible to prevent the bulb unit 102 from being charged due to the incidence of X-rays on the bulb unit 102. In this manner, in the X-ray tube 10, it is possible to suppress the incidence of X-rays on the bulb unit 102.

In addition, since the distal end portion (the end portion on the target T side (electron emission side)) of the second grid electrode 124 is disposed so as to be located in the head unit 101, the X-rays from the X-ray generation position P toward the bulb unit 102 can be efficiently blocked compared with a case where the entire second grid electrode 124 is disposed so as to be located in the bulb unit 102. If the entire second grid electrode 124 is disposed so as to be located in the bulb unit 102, the X-rays from the X-ray generation position P toward the bulb unit 102 are already widespread even in the vicinity of the distal end portion of the second grid electrode 124. For this reason, in order to block the X-rays from the X-ray generation position P toward the bulb unit 102 by using the second grid electrode 124, it is necessary to continuously extend the second grid electrode 124 to the vicinity of the inner wall of the bulb unit 102. In this case, since the second grid electrode 124 and the vacuum housing unit 100 are close to each other, the withstand voltage capability between the second grid electrode 124 and the vacuum housing unit 100 is reduced and accordingly, electric discharge is likely to occur. In addition, since the weight of the second grid electrode 124 is greatly increased, the earthquake resistance of the electron gun unit 110 is also reduced. On the other hand, by arranging the distal end portion (the end portion on the target T side (electron emission side)) of the second grid electrode 124 so as to be located in the head unit 101, the X-rays can be blocked before the X-rays spread greatly from the X-ray generation position P. Therefore, since it is possible to suppress an increase in the size of an X-ray shielding portion (for example, the protruding portion 124*b*) of the second grid electrode 124, it is possible to suppress a decrease in withstand voltage capability and earthquake resistance of the electron gun unit 110.

The second grid electrode 124 has the protruding portion 124*b* that protrudes outward from the tubular portion 124*a*. Therefore, the second grid electrode 124 can efficiently block the line of sight from the X-ray generation position P to the bulb unit 102 by using the protruding portion 124*b*. That is, the second grid electrode 124 can efficiently block the X-rays from the X-ray generation position P toward the bulb unit 102 by using the protruding portion 124*b*. In this case, the second grid electrode 124 can efficiently block the line of sight toward the bulb unit 102 by using the protruding portion 124*b* while suppressing an increase in the size of the entire second grid electrode 124.

In addition, the second grid electrode 124 has a shape in which a portion other than the protruding portion 124*b* is narrowed down. That is, the second grid electrode 124 has a shape in which a portion of the tubular portion 124*a*, in which the protruding portion 124*b* is not provided, is narrowed down with respect to a portion in which the protruding portion 124*b* is provided (a shape having a small outer diameter). Therefore, in a portion of the second grid electrode 124 other than the protruding portion 124*b* (a portion where the outer peripheral surface of the tubular portion 124*a* is exposed), the distance between the inner surface of the head unit 101 and the outer peripheral surface of the second grid electrode 124 can be increased. For this reason, the second grid electrode 124 can suppress the generation of electric discharge between the inner surface of the head unit 101 and the outer peripheral surface of the second grid electrode 124.

In addition, since a portion other than the protruding portion 124*b* of the second grid electrode 124 is narrowed down, the size of the entire second grid electrode 124 can be reduced. Therefore, since the increase in the weight of the second grid electrode 124 itself is suppressed, the decrease in earthquake resistance of the electron gun unit 110 can also be suppressed.

The protruding portion 124*b* is provided at an end portion on the front side (target T side) of the outer peripheral surface of the tubular portion 124*a*. In this case, the protruding portion 124*b* can block X-rays at a position closer to the X-ray generation position P. That is, the protruding portion 124*b* can block X-rays before the X-rays spread greatly from the X-ray generation position P. As a result, in the X-ray tube 10, it is possible to suppress the incidence of X-rays on the bulb unit 102 while suppressing the protruding height of the protruding portion 124*b*.

In addition, the shape of the second grid electrode 124 is not limited to the shape described above. For example, the corner portions K1 and K2 of the protruding portion 124*b* provided in the second grid electrode 124 may not be rounded so as to be curved. The protruding portion 124*b* may not be provided at the end portion on the target T side on the outer peripheral surface of the tubular portion 124*a*. That is, the protruding portion 124*b* may be provided, for example, at a position shifted rearward from the end portion on the target T side on the outer peripheral surface of the tubular portion 124*a*.

First Modification Example of X-Ray Tube

Figure 3:
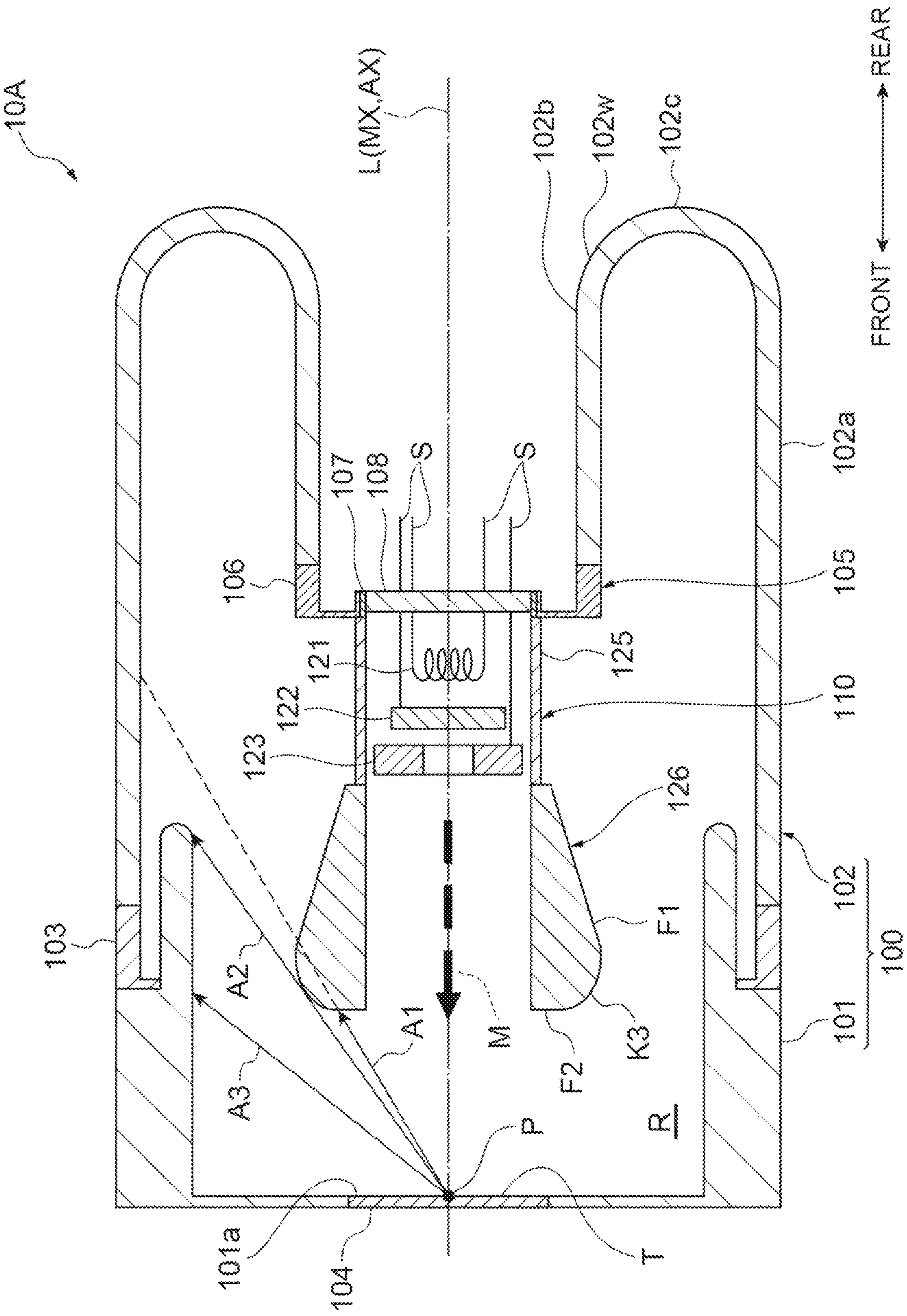
FIG. 3 is an end view of an X-ray tube according to a first modification example when the X-ray tube is cut in the vertical direction.

Next, a first modification example of the X-ray tube 10 according to the above embodiment will be described. Hereinafter, the differences from the X-ray tube 10 according to the embodiment will be mainly described, and the description of the common configuration will be omitted. Also in the other modification examples described below, only the differences will be mainly described. As shown in FIG. 3, an X-ray tube 10A includes a second grid electrode (focusing electrode portion) 126 having a shape different from that of the second grid electrode 124, instead of the second grid electrode 124 of the X-ray tube 10 according to the embodiment.

The second grid electrode 126 has a tubular shape. In the present embodiment, the second grid electrode 126 has a cylindrical shape extending along the axis L. The outer peripheral surface F1 of the second grid electrode 126 has a tapered shape whose diameter increases toward the target T. In this modification example, as an example, the outer peripheral surface F1 of the second grid electrode 126 has a tapered shape whose diameter increases gradually (smoothly) toward the target T at a predetermined rate. The thickness of the cylinder of the second grid electrode 126 increases toward the target T side (toward the front side).

In addition, FIG. 3 shows a case of a cylindrical shape extending linearly along the axis L direction as an example of the shape of the inner peripheral surface of the second grid electrode 126. However, various shapes can be adopted as the shape of the inner peripheral surface of the second grid electrode 126.

A corner portion K3 between the outer peripheral surface F1 of the second grid electrode 126 and the end surface F2 on the target T side (front side) of the second grid electrode 126 is rounded so as to be curved. Therefore, the second grid electrode 126 increases in diameter up to a predetermined position toward the target T due to the tapered shape and then decreases in diameter due to the curvature at the corner portion K3, leading to the end surface F2. In addition, the end surface F2 is a flat surface portion facing the target T. That is, since the end surface F2 at the most distal end portion of the second grid electrode 126 is a flat surface portion facing the target T, it is possible to block X-rays at a position closer to the X-ray generation position P. That is, since the X-rays can be blocked before the X-rays spread greatly from the X-ray generation position P, it is possible to suppress an increase in the diameter of the tapered shape. Therefore, it is possible to suppress a decrease in withstand voltage capability and earthquake resistance of the electron gun unit 110. In addition, since the thickness of the cylinder of the second grid electrode 126 increases toward the target T side (toward the front side), it is possible to provide sufficient X-ray shielding capability on the target T side (front side) and suppress unnecessary weight increase on the rear side.

As described above, the second grid electrode 126 of the X-ray tube 10A has a large diameter at the end portion on the target T side, and the large diameter portion can efficiently block the line of sight from the X-ray generation position P to the bulb unit 102. That is, the second grid electrode 126 can efficiently block the X-rays from the X-ray generation position P to the bulb unit 102 by using the large diameter portion. Thus, the second grid electrode 126 can efficiently block the X-rays directed to the bulb unit 102 while suppressing an increase in the size of the entire second grid electrode 126. Therefore, in the X-ray tube 10A, it is possible to suppress the incidence of X-rays on the bulb unit 102, similarly to the X-ray tube 10 according to the embodiment.

In addition, the second grid electrode 126 has a shape that narrows down as the distance from the target T increases. That is, the outer diameter of the outer peripheral surface F1 of the second grid electrode 126 decreases as the distance from the target T increases. Therefore, in a portion of the second grid electrode 126 other than the large diameter portion, the distance between the inner surface of the head unit 101 and the outer peripheral surface F1 of the second grid electrode 126 can be increased. For this reason, the second grid electrode 126 can suppress the generation of electric discharge between the inner surface of the head unit 101 and the outer peripheral surface F1 of the second grid electrode 126.

In addition, the outer peripheral surface F1 of the second grid electrode 126 has a smooth tapered shape, and a portion (recessed portion) having a shape that is recessed toward the inside (inner peripheral side) is not formed on the outer peripheral surface F1 of the second grid electrode 126. Therefore, in addition to suppressing the local concentration of the electric field on the outer peripheral surface F1 and suppressing electric discharge, it is possible to suppress the adhesion of dust and the like to the outer peripheral surface F1 of the second grid electrode 126. As the dust and the like, for example, shavings when forming the second grid electrode 126 can be mentioned. As described above, in the X-ray tube 10A, since it is possible to suppress the adhesion of dust and the like to the outer peripheral surface F1 of the second grid electrode 126, it is possible to suppress the generation of electric discharge starting from the dust and the like.

The corner portion K3 of the second grid electrode 126 is rounded so as to be curved. In this case, in the second grid electrode 126, the concentration of the electric field on the corner portion K3 is suppressed. Therefore, it is possible to suppress the generation of electric discharge starting from the corner portion K3.

In addition, the shape of the second grid electrode 126 is not limited to the shape described above. For example, the corner portion K3 of the second grid electrode 126 may not be rounded so as to be curved.

Modification Example of Second Grid Electrode

Figure 4:
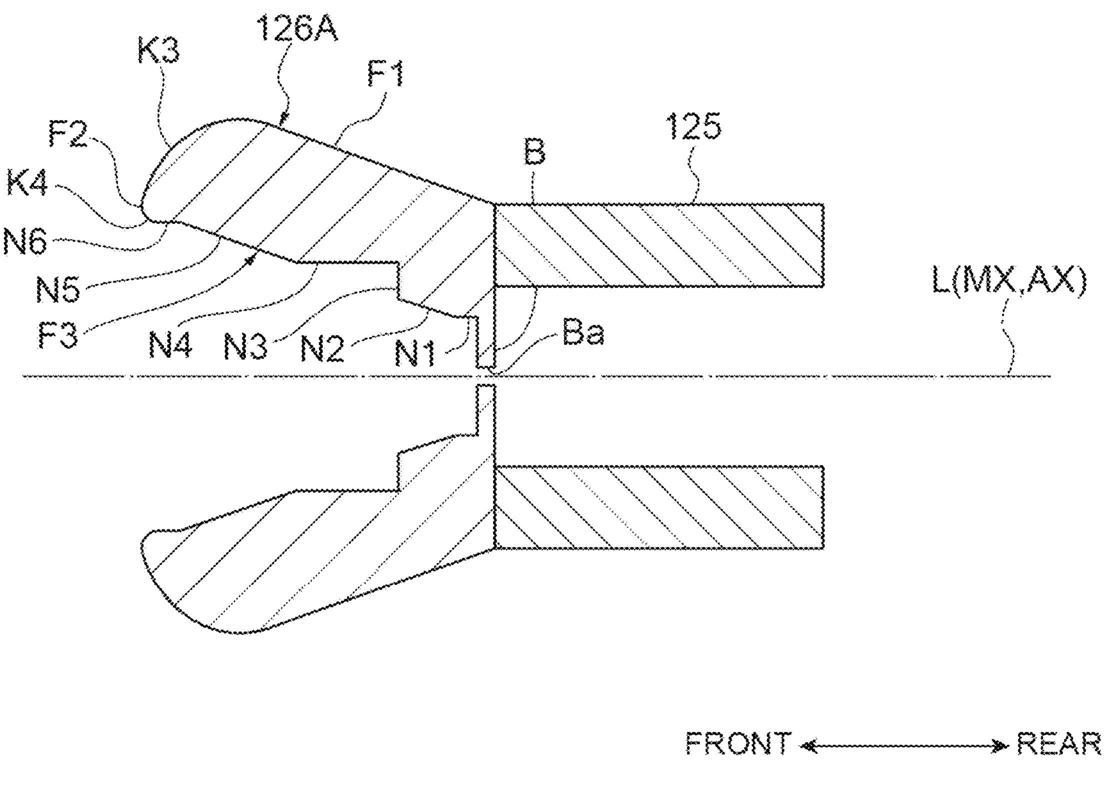
FIG. 4 is a modification example of a second grid electrode of the X-ray tube according to the first modification example, and is an end view of the second grid electrode cut in the vertical direction.

Next, a modification example of the second grid electrode 126 of the X-ray tube 10A according to the first modification example will be described. As shown in FIG. 4, the main difference between a second grid electrode (focusing electrode portion) 126A and the second grid electrode 126 in the first modification example described above is the shape of the inner peripheral surface F3.

The second grid electrode 126A includes a rear wall portion B at an end portion on the rear side (electron gun housing unit 125 side). An exit hole Ba through which electrons emitted from the cathode 122 pass is provided in the rear wall portion B. On the front side of the rear wall portion B, the shape of the inner peripheral surface F3 of the second grid electrode 126A is an approximately tapered shape whose diameter increases toward the target T side. More specifically, the inner peripheral surface F3 of the second grid electrode 126A is configured to include a first tubular portion N1, a first tapered tubular portion N2, a connection portion N3, a second tubular portion N4, a second tapered tubular portion N5, and a third tubular portion N6 in this order from the rear wall portion B side toward the end portion on the target T side.

The first tubular portion N1 extends along the axis L, and has a cylindrical shape having a diameter larger than that of the exit hole Ba. The inner diameter of the first tubular portion N1 is fixed. The first tapered tubular portion N2 extends along the axis L, and has a tapered shape whose diameter increases gradually toward the target T side. The rear-side end portion of the first tapered tubular portion N2 is connected to the front-side end portion of the first tubular portion N1. The second tubular portion N4 extends along the axis L and has a cylindrical shape. The inner diameter of the second tubular portion N4 is larger than the front-side inner diameter of the first tapered tubular portion N2. The inner diameter of the second tubular portion N4 is fixed. The connection portion N3 has an annular shape that connects the front-side end portion of the first tapered tubular portion N2 and the rear-side end portion of the second tubular portion N4 to each other.

The second tapered tubular portion N5 extends along the axis L, and has a tapered shape whose diameter increases gradually toward the target T side. The rear-side end portion of the second tapered tubular portion N5 is connected to the front-side end portion of the second tubular portion N4. The third tubular portion N6 extends along the axis L and has a cylindrical shape. The inner diameter of the third tubular portion N6 is the same as the front-side inner diameter of the second tapered tubular portion N5. The rear-side end portion of the third tubular portion N6 is connected to the front-side end portion of the second tapered tubular portion N5.

As an example, the length of the first tubular portion N1 in the axis L direction is shorter than the length of the first tapered tubular portion N2 in the axis L direction. As an example, the length of the first tapered tubular portion N2 in the axis L direction is shorter than the length of the second tubular portion N4 in the axis L direction. As an example, the length of the second tubular portion N4 in the axis L direction is shorter than the length of the second tapered tubular portion N5 in the axis L direction. As an example, the length of the third tubular portion N6 in the axis L direction is longer than the length of the first tubular portion N1 in the axis L direction and shorter than the length of the first tapered tubular portion N2 in the axis L direction.

A corner portion K4 between the inner peripheral surface F3 (third tubular portion N6) of the second grid electrode 126A and the end surface F2 on the target T side (front side) of the second grid electrode 126A is rounded so as to be curved. In this modification example, as an example, the curved R shape (curvature) at the corner portion K3 is gentler (smaller in curvature) than the curved R shape (curvature) at the corner portion K4.

As described above, the second grid electrode 126A can suppress the incidence of X-rays on the bulb unit 102, similarly to the second grid electrode 126 in the first modification example. In addition, in the second grid electrode 126A, by making the curved R shape (curvature) at the corner portion K3 connecting the outer peripheral surface F1 and the end surface F2 gentle so that the outer surface has a smooth shape and by making the shape of the inner peripheral surface F3 as described above, it is possible to suppress a decrease in withstand voltage capability and at the same time, to appropriately focus the electrons emitted from the cathode 122.

In addition, the shape of the second grid electrode 126A is not limited to the shape described above. For example, the corner portions K3 and K4 of the second grid electrode 126 may not be rounded so as to be curved. In addition, the shape of the inner peripheral surface F3 of the second grid electrode 126A is not limited to the shape described above.

Second Modification Example of X-Ray Tube

Figure 5:
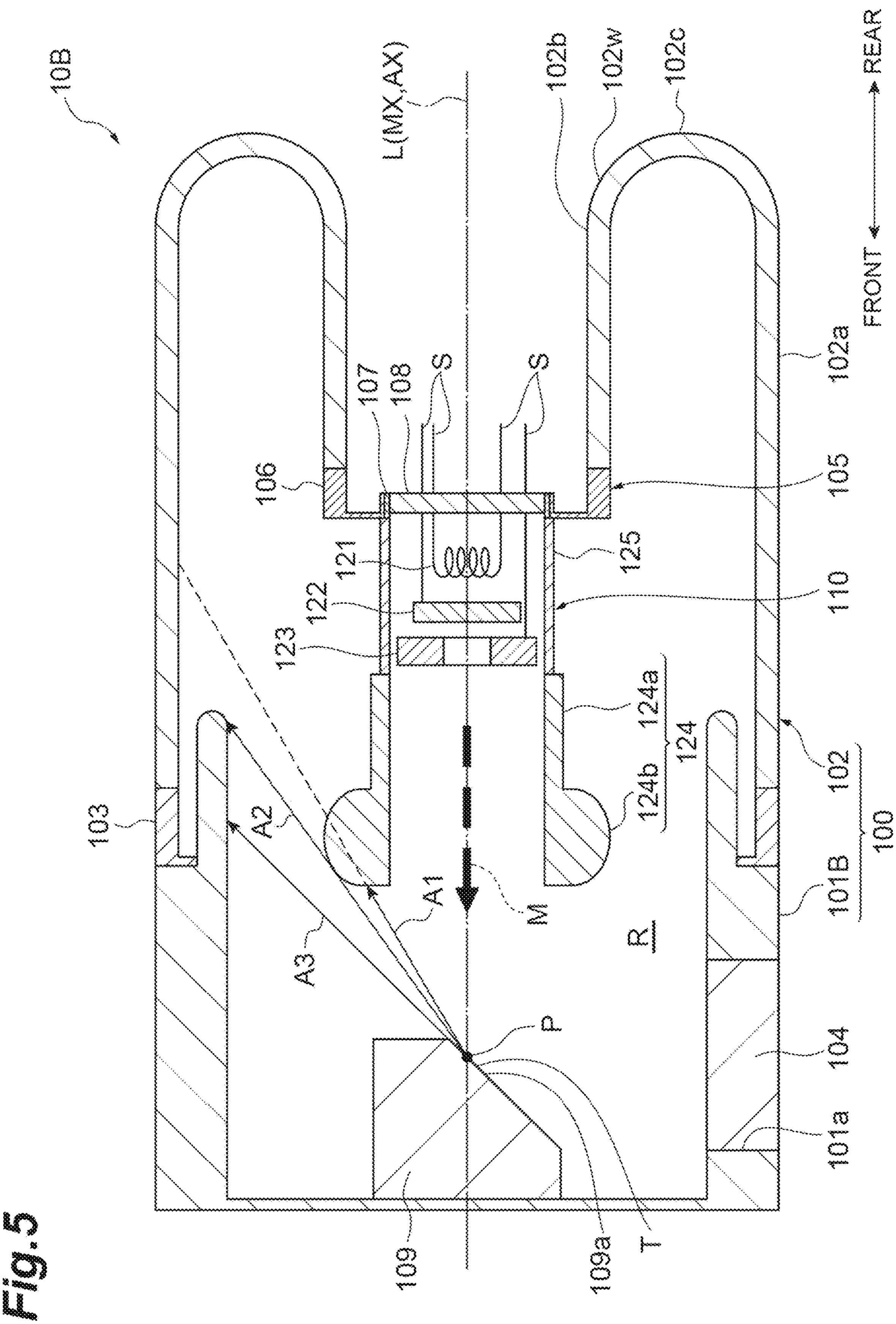
FIG. 5 is an end view of an X-ray tube according to a second modification example when the X-ray tube is cut in the vertical direction.

Next, a second modification example of the X-ray tube 10 according to the above embodiment will be described. As shown in FIG. 5, an X-ray tube 10B is a reflective X-ray tube. The X-ray tube 10B includes a target support 109 that supports the target T at a position on the front side of the electron gun unit 110. The target T is formed on a target forming surface 109*a* of the target support 109. The target forming surface 109*a* is provided on the outer surface of the target support 109 so that the normal direction of the target forming surface 109*a* and the axis L direction cross each other.

A head unit (metal housing unit) 101B of the X-ray tube 10B has an opening 101*a* at a position different from the front position on the front side of the electron gun unit 110. Similarly to the head unit 101 of the X-ray tube 10 according to the embodiment described above, the head unit 101B is formed of a metal material and potentially corresponds to the anode of the X-ray tube 10B. The opening 101*a* of the head unit 101B is covered by the X-ray emission window 104. The X-ray tube 10B emits X-rays, which are generated due to the incidence of the electron beam M from the electron gun unit 110 on the target T, from the X-ray emission window 104.

The second grid electrode 124 blocks the line of sight from the X-ray generation position P toward the bulb unit 102. Specifically, as shown by the arrow A1, the line of sight from the X-ray generation position P to the bulb unit 102 (outer cylinder 102*a*) is blocked by the protruding portion 124*b*. In addition, the line of sight indicated by the arrows A2 and A3 is directed from the X-ray generation position P toward the head unit 101B, and is not blocked by the second grid electrode 124.

As described above, the X-ray tube 10B is a reflective X-ray tube. Even in this case, in the X-ray tube 10B, it is possible to block the X-rays from the X-ray generation position P toward the bulb unit 102 by using the second grid electrode 124, so that it is possible to suppress the incidence of X-rays on the bulb unit 102, as in the X-ray tube 10 according to the embodiment.

Third Modification Example of X-Ray Tube

Figure 6:
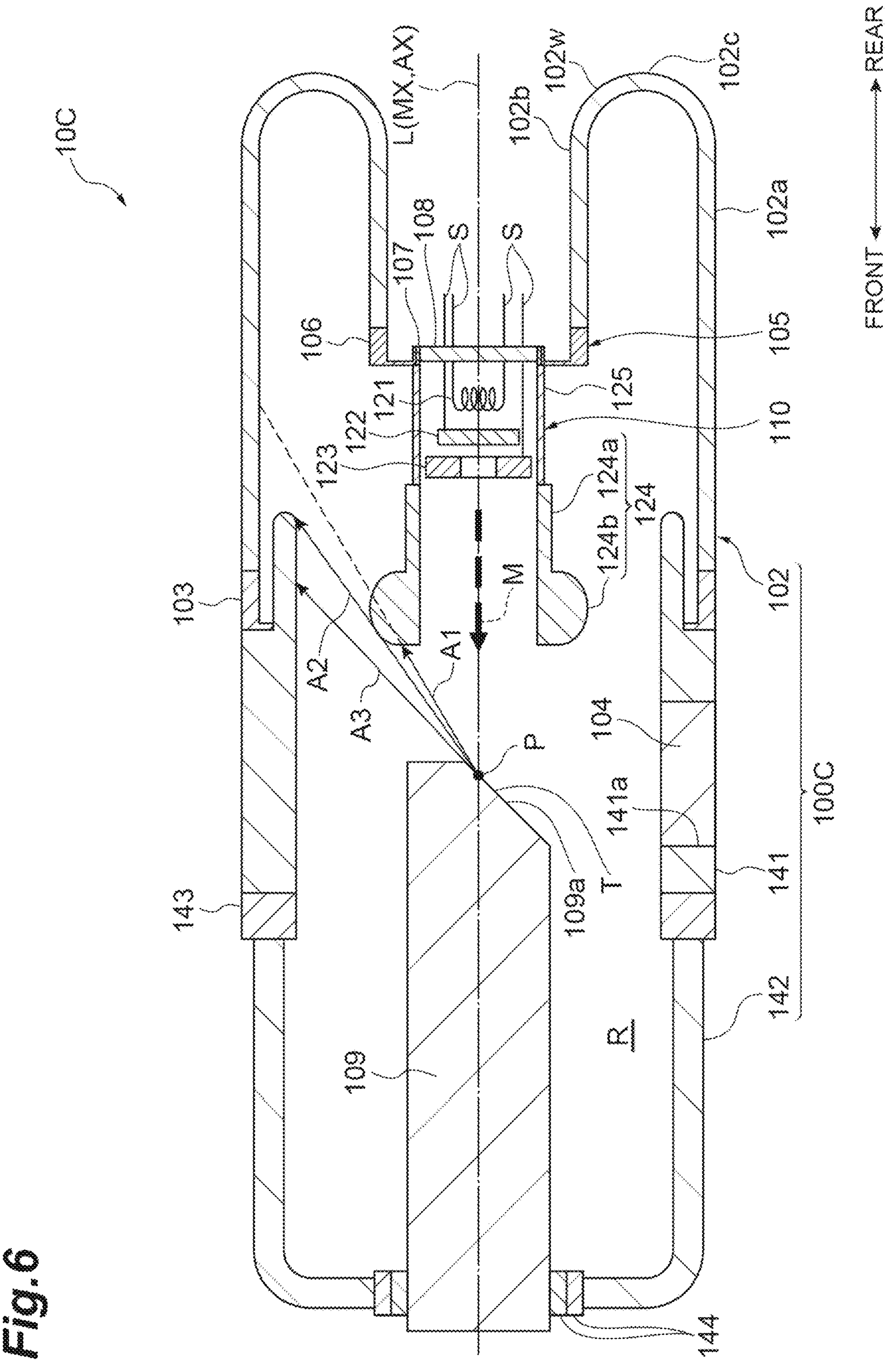
FIG. 6 is an end view of an X-ray tube according to a third modification example when the X-ray tube is cut in the vertical direction.

Next, a third modification example of the X-ray tube 10 according to the above embodiment will be described. As shown in FIG. 6, an X-ray tube 10C according to this modification example is a reflective X-ray tube similarly to the X-ray tube 10C according to the second modification example. However, in the X-ray tube 10C according to this modification example, the target support 109 that supports the target T is held by a holding bulb unit 142.

More specifically, a vacuum housing unit 100C includes a bulb unit 102, a housing unit (metal housing unit) 141, and a holding bulb unit 142. The housing unit 141 is formed of a metal material (for example, stainless steel, copper, copper alloy, or iron alloy). The housing unit 141 has a cylindrical shape, and is disposed so as to extend along the axis L. An opening portion 141*a* is provided in the housing unit 141. The opening portion 141*a* is covered by the X-ray emission window 104. The rear-side end portion of the housing unit 141 is connected to the front-side end portion of the bulb unit 102 by the bulb flange 103.

The holding bulb unit 142 is formed of an insulating material (for example, glass or ceramic). The holding bulb unit 142 has a cylindrical shape, and is disposed so as to extend along the tube axis AX (axis L). The rear-side end portion of the holding bulb unit 142 is connected to the front-side end portion of the housing unit 141 by a connection portion 143 formed of a metal material, such as Kovar.

The target support 109 that supports the target T is disposed in the housing unit 141 and the holding bulb unit 142. The target support 109 is connected to the front-side end portion of the holding bulb unit 142, and extends from the portion for connection with the holding bulb unit 142 toward the electron gun unit 110 side. The holding bulb unit 142 is connected to the target support 109 by a connection portion 144 formed of a metal material, such as Kovar. Thus, the housing unit 141 supports the target T (target support 109) through the holding bulb unit 142. The X-ray tube 10C emits X-rays, which are generated due to the incidence of the electron beam M from the electron gun unit 110 on the target T, from the X-ray emission window 104.

Here, in the X-ray tube 10C of this modification example, the electron gun unit 110 is supported by the insulator (bulb unit 102), and the target T (target support 109) is also supported by the insulator (holding bulb unit 142). Therefore, a voltage can be applied to each of the electron gun unit 110 side and the target T side. That is, for example, when the X-ray tube 10C requires a voltage of 100 kV for X-ray emission, a voltage of −50 kV is applied to the electron gun unit 110 side and a voltage of 50 kV is applied to the target T side with the housing unit 141 as a ground potential. Then, the required potential difference of 100 kV can be obtained between the target T and the electron gun unit 110. In this manner, by dividing the required voltage and applying the obtained voltages to the target T side and the electron gun unit 110 side, the voltage value itself applied to each part can be reduced, so that the withstand voltage capability required for each part can be reduced.

Also in the X-ray tube 10C according to this modification example, the line of sight from the X-ray generation position P toward the bulb unit 102 can be blocked by the second grid electrode 124. Therefore, in the X-ray tube 10C, it is possible to block the X-rays from the X-ray generation position P toward the bulb unit 102 by using the second grid electrode 124, so that it is possible to suppress the incidence of X-rays on the bulb unit 102, as in the X-ray tube 10 according to the embodiment.

Fourth Modification Example of X-Ray Tube

Figure 7:
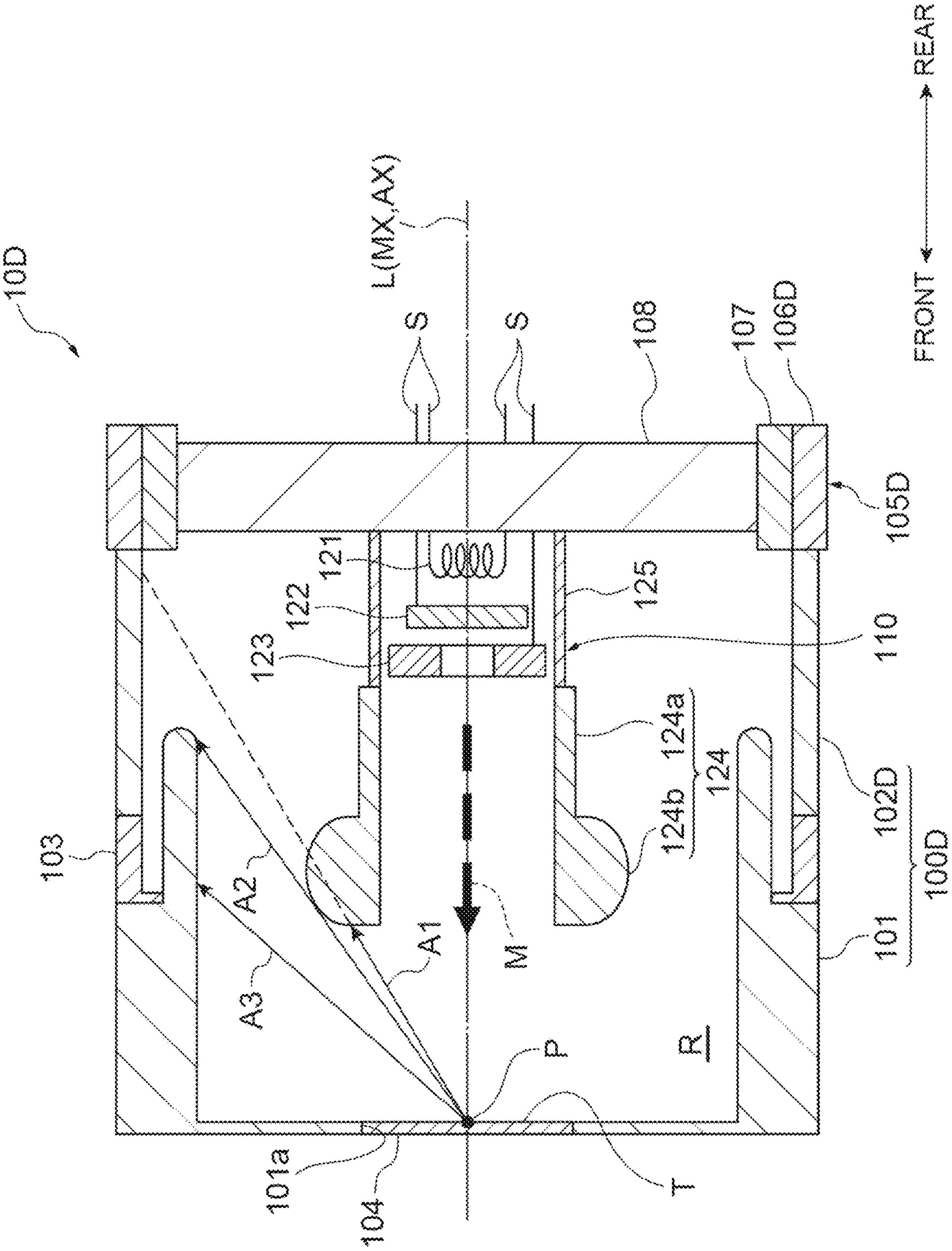
FIG. 7 is an end view of an X-ray tube according to a fourth modification example when the X-ray tube is cut in the vertical direction.

Next, a fourth modification example of the X-ray tube 10 according to the above embodiment will be described. As shown in FIG. 7, in an X-ray tube 10D, unlike in the X-ray tube 10 of the embodiment described above, a bulb unit 102D has a cylindrical shape. That is, unlike in the X-ray tube 10 of the embodiment described above, the bulb unit 102D has a cylindrical shape in which a rear-side end portion is not folded back and extends linearly. The X-ray tube 10D includes a vacuum housing unit 100D, an electron gun unit 110, and a target T.

The electron gun unit 110C and the target T are housed in the vacuum housing unit 100D. The vacuum housing unit 100D includes the head unit 101 and the bulb unit 102D formed of an insulating material (for example, glass or ceramic). The head unit 101 and the bulb unit 102D are connected to each other by the bulb flange 103 formed of Kovar or the like.

The bulb unit 102D is formed in a cylindrical shape extending along the tube axis AX (axis L). A stem portion 105D is provided at an opening in the rear-side end portion of the bulb unit 102D so as to seal the opening. An opening in the front-side end portion of the bulb unit 102D is sealed by the head unit 101.

The stem portion 105D holds the electron gun unit 110 at a predetermined position in the internal space R. That is, the electron gun unit 110 is supported by the bulb unit 102D through the stem portion 105D. The stem portion 105D includes a bulb flange 106D, a stem flange 107, and a stem 108. The bulb flange 106D is formed of a conductive material (for example, Kovar), and has a cylindrical shape. The stem flange 107 is fitted and fixed in the bulb flange 106D. The bulb flange 106D is connected to the rear-side end portion of the bulb unit 102D.

Also in the X-ray tube 10D according to this modification example, the line of sight from the X-ray generation position P toward the bulb unit 102D can be blocked by the second grid electrode 124. Therefore, in the X-ray tube 10D, it is possible to block the X-rays from the X-ray generation position P toward the bulb unit 102D by using the second grid electrode 124, so that it is possible to suppress the incidence of X-rays on the bulb unit 102D, as in the X-ray tube 10 according to the embodiment.

While various embodiments and modification examples of the present disclosure have been described above, the present disclosure is not limited to the above embodiments and modification examples. For example, at least some of the various embodiments and various modification examples described above may be arbitrarily combined.

For example, the X-ray tube 10D according to the fourth modification example shown in FIG. 7 may be a reflective X-ray tube, similarly to the X-ray tube 10B shown in FIG. 5. In addition, the X-ray tube 10D according to the fourth modification example shown in FIG. 7 may be configured to hold a target support on which the target T is provided by a holding bulb formed of an insulating material, similarly to the X-ray tube 10C shown in FIG. 6.

The second grid electrode may block the line of sight from the X-ray generation position to the bulb unit by using a configuration other than the configuration including the protruding portion 124*b* as in the second grid electrode 124 and the configuration having a tapered shape as in the second grid electrode 126. For example, the entire second grid electrode may be made thick, instead of being partially thickened by the protruding portion 124*b* as in the second grid electrode 124 in the embodiment.

REFERENCE SIGNS LIST

10, 10A, 10B, 10C, 10D: X-ray tube, 100, 100C, 100D: vacuum housing unit, 101, 101B: head unit (metal housing unit), 102, 102D: bulb unit, 110: electron gun unit, 124, 126, 126A: second grid electrode (focusing electrode portion), 124*b*: protruding portion, 141: housing unit (metal housing unit), F1: outer peripheral surface, F2: end surface, K1 to K4: corner portion, T: target, XR: X-ray.

The invention claimed is:

1. An X-ray tube, comprising:

an electron gun unit that emits electrons;

a target that generates X-rays due to incidence of the electrons; and a vacuum housing unit in which the electron gun unit and the target are housed, wherein the vacuum housing unit has a metal housing unit for supporting the target and a bulb unit formed of an insulating material and connected to the metal housing unit, the electron gun unit has a focusing electrode portion at an end portion on an emission side of the electrons, the focusing electrode portion having a tubular shape for focusing the emitted electrons, and at least a part of the focusing electrode portion is supported by the bulb unit so as to be located in the metal housing unit such that the metal housing unit extends to the location of the focusing electrode portion, when viewed from an X-ray generation position on the target, the focusing electrode portion blocks a line of sight from the X-ray generation position to the bulb unit, the focusing electrode portion has a protruding portion that protrudes outward, a portion of the focusing electrode portion in which the protruding portion is provided is located in the metal housing unit, the protruding portion protrudes toward the metal housing unit to reduce a space between the metal housing unit and the focusing electrode portion, and the focusing electrode portion includes a tubular portion, and the protruding portion provided on an outer peripheral surface of the tubular portion and being thicker than the tubular portion by thickening a material of a wall forming the tubular portion along a segment of the tubular portion.

2. The X-ray tube according to claim 1, wherein the protruding portion is provided at an end portion on the target side on an outer peripheral surface of the focusing electrode portion.

3. The X-ray tube according to claim 1, wherein a corner portion of the protruding portion is rounded so as to be curved.

4. The X-ray tube according to claim 1, wherein the focusing electrode portion is formed of a high melting point metal material.

5. An X-ray tube, comprising:

an electron gun unit that emits electrons;

a target that generates X-rays due to incidence of the electrons; and a vacuum housing unit in which the electron gun unit and the target are housed, wherein the vacuum housing unit has a metal housing unit for supporting the target and a bulb unit formed of an insulating material and connected to the metal housing unit, the electron gun unit has a focusing electrode portion at an end portion on an emission side of the electrons, the focusing electrode portion having a tubular shape for focusing the emitted electrons, and at least a part of the focusing electrode portion is supported by the bulb unit so as to be located in the metal housing unit, when viewed from an X-ray generation position on the target, the focusing electrode portion blocks a line of sight from the X-ray generation position to the bulb unit, an outer peripheral surface of the focusing electrode portion has a tapered shape whose diameter increases toward the target, a maximum diameter portion that is a part with a largest diameter in the outer peripheral surface of the focusing electrode portion having the tapered shape is located in the metal housing unit, and the maximum diameter portion protrudes toward the metal housing unit to reduce a space between the metal housing unit and the focusing electrode portion.

6. The X-ray tube according to claim 5, wherein a corner portion between the outer peripheral surface of the focusing electrode portion and an end surface of the focusing electrode portion on the target side is rounded so as to be curved.

7. The X-ray tube according to claim 5, wherein the focusing electrode portion has a shape in which a thickness increases toward the target.

8. The X-ray tube according to claim 7, wherein the focusing electrode portion is formed of a high melting point metal material.

* * * * *